United States Patent [19]

Lucas

[11] 4,010,843
[45] Mar. 8, 1977

[54] DEVICE FOR TRANSFERRING A LOAD FROM ONE CONVEYOR TO A SECOND CONVEYOR

[76] Inventor: Raymond Roger Louis Lucas, Avenue de la Republique, 33 Prechac, France

[22] Filed: Mar. 13, 1975

[21] Appl. No.: 558,013

[30] Foreign Application Priority Data

June 20, 1974 France .............................. 74.22546

[52] U.S. Cl. ................................ 198/487; 198/614
[51] Int. Cl.$^2$ ........................................ B65G 47/54
[58] Field of Search ............ 198/20, 107, 218, 219, 198/487, 488, 614, 127 R; 214/1 BB

[56] References Cited

UNITED STATES PATENTS

| | | | |
|---|---|---|---|
| 694,696 | 3/1902 | Thomas .............................. | 198/218 |
| 1,240,834 | 9/1917 | Fischer .............................. | 198/107 X |
| 1,671,534 | 5/1928 | Lockhart ............................ | 198/107 |
| 1,931,628 | 10/1933 | von Reis ........................... | 198/107 X |
| 2,808,921 | 10/1957 | Knowles ........................... | 198/218 X |
| 3,243,875 | 4/1966 | Illo ................................... | 198/219 X |
| 3,355,008 | 11/1967 | Milazzo ............................. | 198/219 |
| 3,575,395 | 4/1971 | Gentry .............................. | 198/219 X |
| 3,581,880 | 6/1971 | Iversen ............................. | 198/219 |
| 3,737,019 | 6/1973 | Coleman et al. .................. | 198/127 R |
| 3,754,528 | 8/1973 | Downing .......................... | 198/218 X |
| 3,841,460 | 10/1974 | Suter ................................. | 198/20 R |

FOREIGN PATENTS OR APPLICATIONS

| | | | |
|---|---|---|---|
| 981,505 | 5/1951 | France ............................. | 198/107 |
| 200,217 | 11/1965 | Sweden ........................... | 198/107 |

Primary Examiner—Evon C. Blunk
Assistant Examiner—Richard K. Thomson
Attorney, Agent, or Firm—Marn & Jangarathis

[57] ABSTRACT

A device for transferring a load from one roller conveyor to another comprises a support adapted for shifting transversely and parallel to the axes of the rollers of one of the conveyors and lifting elements such as thin blades on said support which are disposed intermediate adjacent conveyor rollers.

10 Claims, 7 Drawing Figures

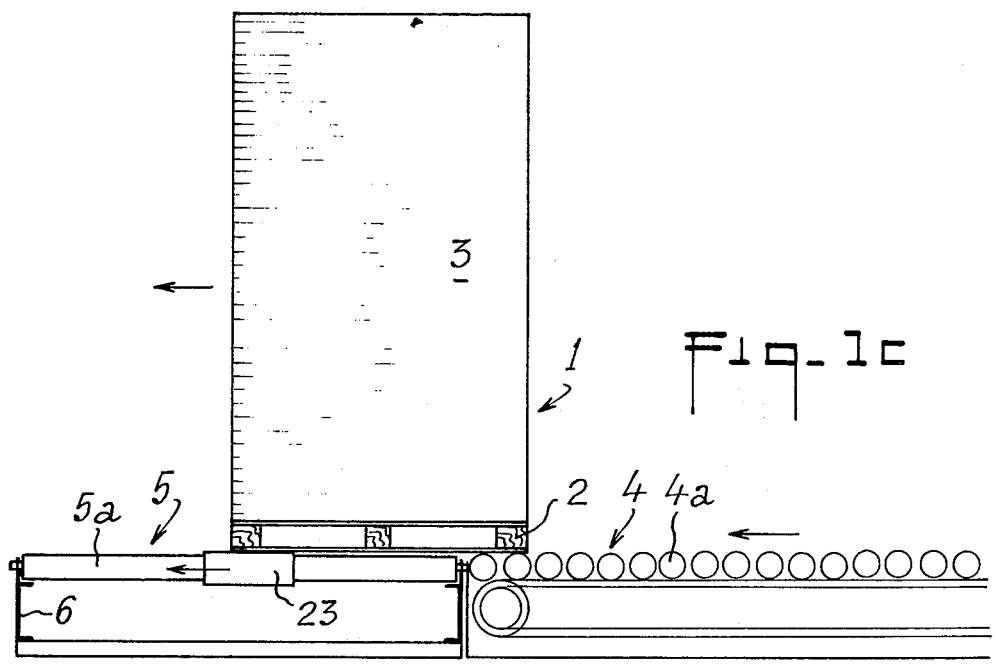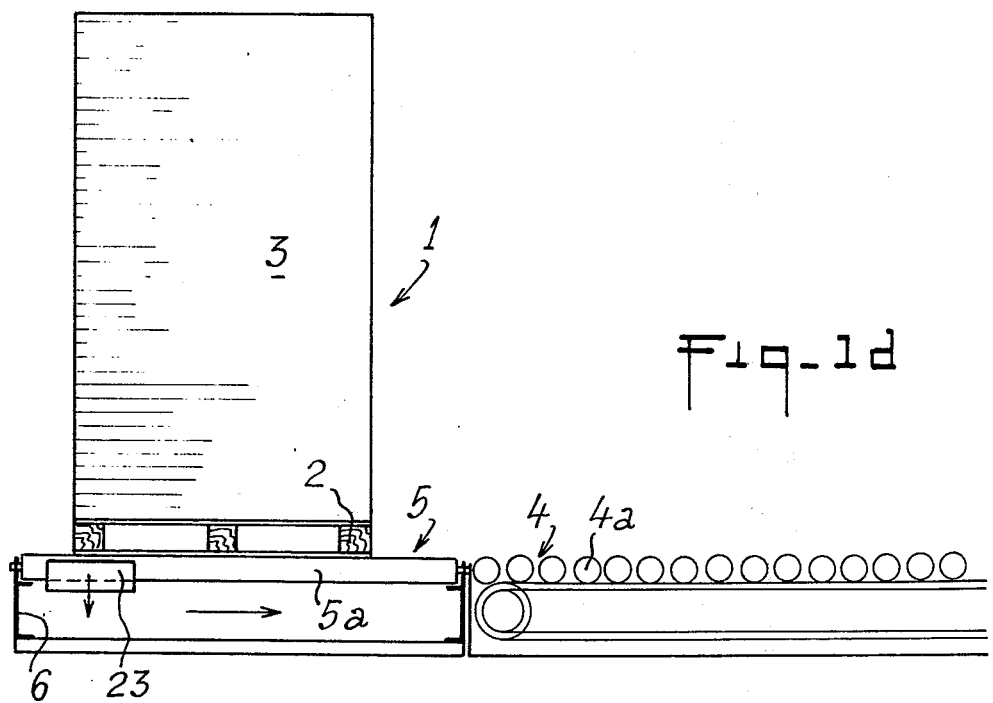

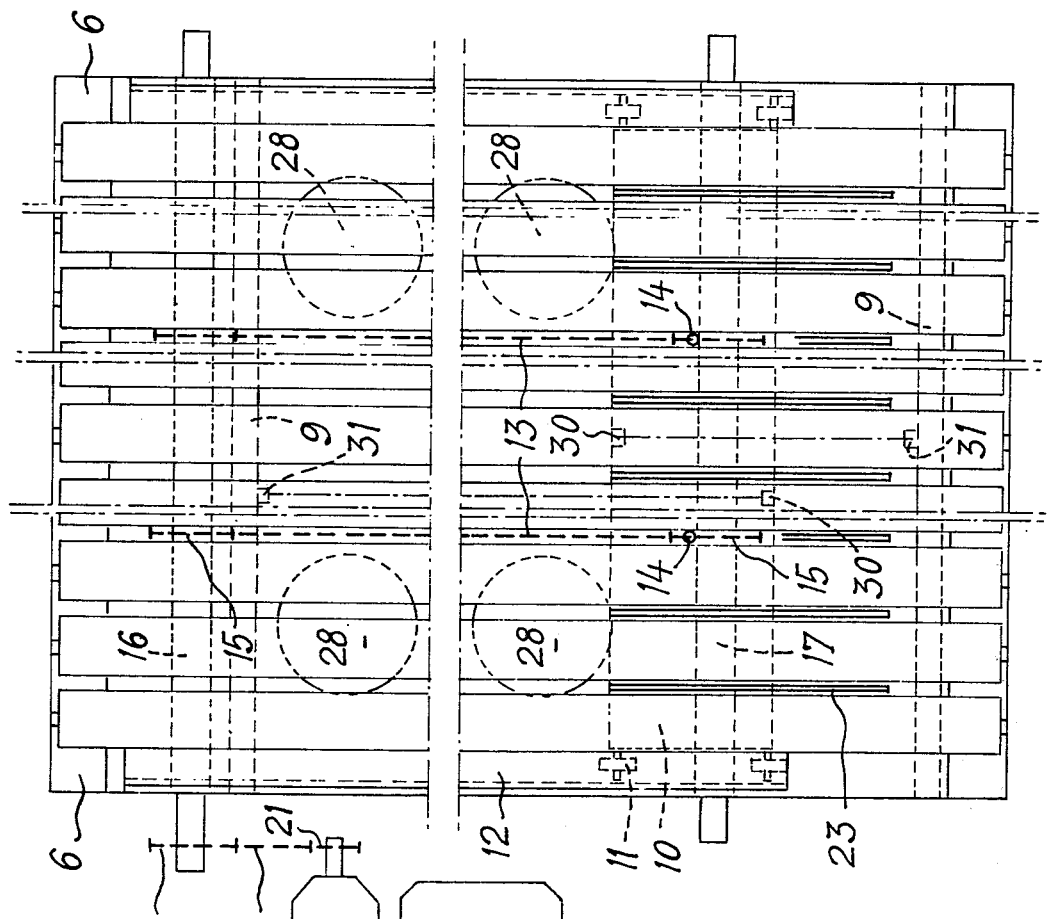

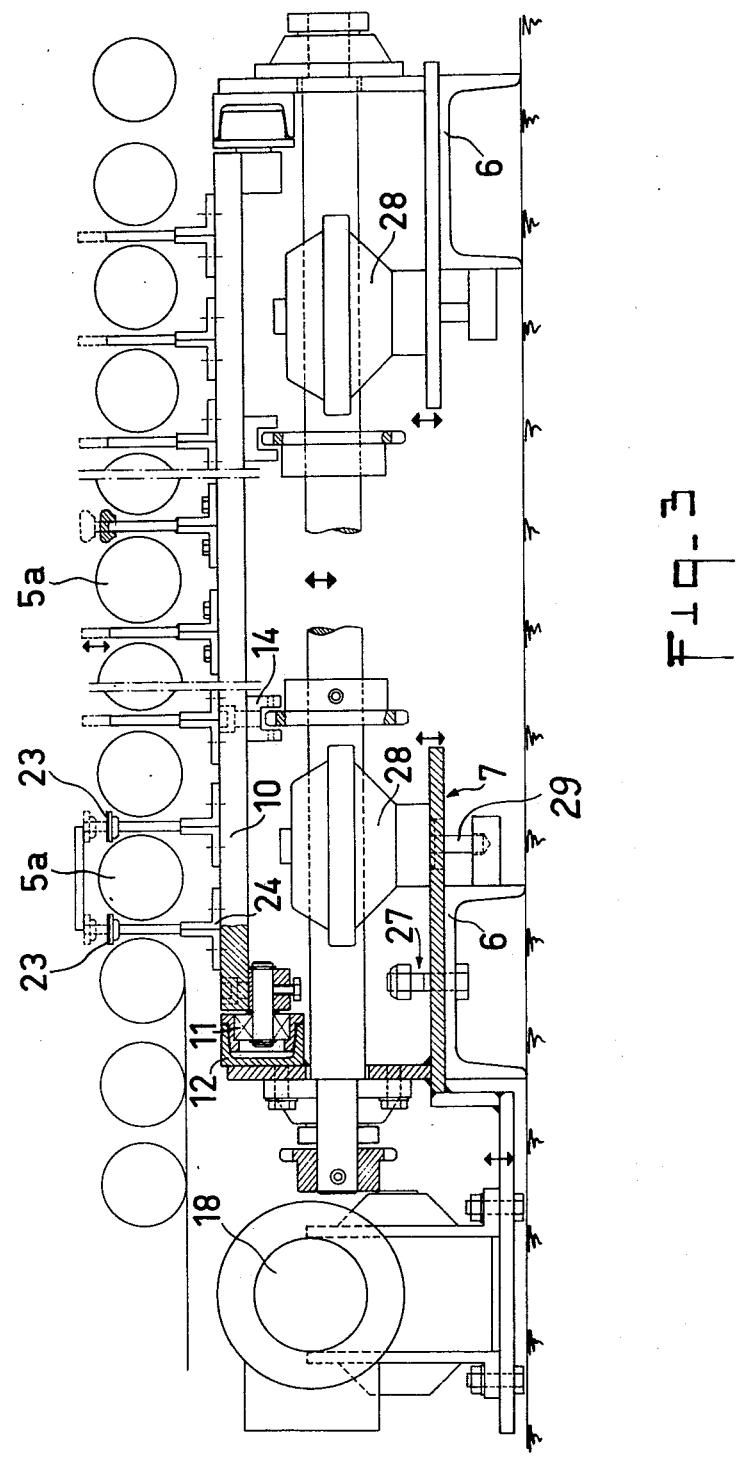

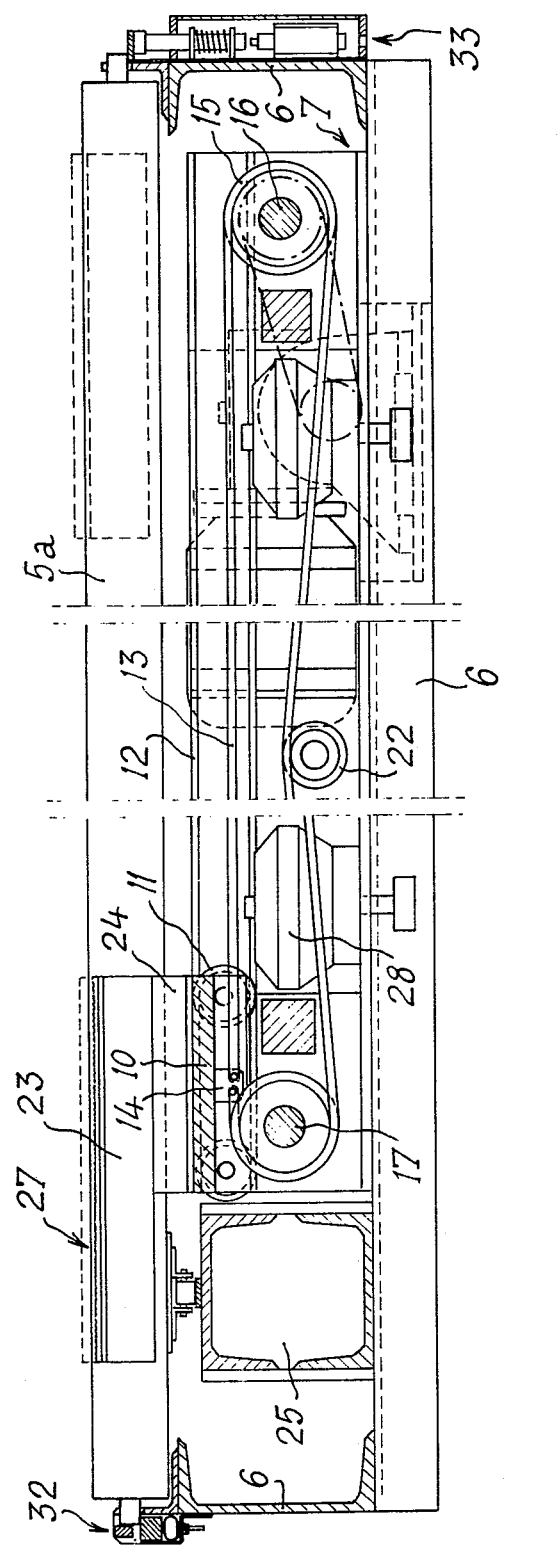

DEVICE FOR TRANSFERRING A LOAD FROM ONE CONVEYOR TO A SECOND CONVEYOR

The present invention relates to a device for transferring a load from one conveyor to another and more particularly for transferring a pallet from a main conveyor to one which moves at right angles thereto.

In fact, in circuits of handling materials at ground level which are formed of conveyors having driven or free rollers it is frequently necessary to transfer a load, pallet or other heavy item from the main conveyor to another discharge conveyor which is perpendicular to the main conveyor, the difficulty of transfer residing in the fact that the generatrices of the rollers of the respective conveyors are necessarily perpendicular.

In order to effect transfer it has, in the first instance, been proposed to shift the load by means of a pusher which moves parallel to the generatrices of the rollers of the transverse or discharge conveyor. However, for these pushers to be efficient they need to be incorporated in the conveyor at the time of manufacture of the main and transverse conveyors since, by virtue of their structure, they are not readily adaptable to already existing handling systems. Moreover, they are only capable of pushing in one direction and thus do not enable a load to be transferred in the reverse sense, e.g. from the transverse conveyor to the main conveyor, when they have been designed and constructed for the purpose of effecting transfer in the other sense.

A different solution consists of providing endless chains driven by sprockets normally situated parallel to the axes of the rollers and at a lower level than the latter. Hence, when a load such as an idle pallet arrives in the transfer zone on the main conveyor the chains become raised to be positioned under the load and to lift it slightly, the movement of the chains entraining the load towards the transverse or discharge conveyor. When the entire load is on the transverse or discharge conveyor the chains are again lowered so as to return to below the level of the rollers of the main conveyor.

A major drawback of this chain device resides in the fact that the space necessary for housing the said chains has to be provided in the transfer zone between the rollers and thus results in discontinuous conveyors being obtained since the spacing between adjacent rollers is different from that of the zones of the conveyor where no transfer operation is envisaged. This kind of device cannot, therefore, be incorporated in already existing conveyors. Moreover, these different spacings of the rollers of one and the same conveyor may cause canting and unbalancing of the loads. It should also be noted that such transfer chains cannot safely handle fragile or sensitive loads whose external surface should not be deformed.

Finally, the chains need to be strong enough to support a substantial part of the weight of the load during the transfer operation.

It is an object of the present invention to mitigate these drawbacks.

According to the present invention there is provided a device for transferring a load between two perpendicular conveyors, comprising a support movable in directions transversely and parallel to the axes of the rollers of one of the conveyors, and lifting elements on said support and disposed between adjacent ones of said rollers.

Preferably the support comprises a carriage disposed below said rollers of one of the conveyors and drive chains integral with the carriage and extending in a direction parallel to the axes of said rollers, which makes it possible to separate the supporting functions from the driving function now provided by the chains secured to said support.

Advantageously the support may include an independent chassis which is disposed between the frame of said one of the conveyors and the rollers of said one of the conveyors, and is transversely movable relative to the plane including the axes of said rollers, the said chassis comprising rolling tracks for said mobile carriage to make it possible to equip any already existing conveyors with the device of the invention.

More advantageously the lifting elements comprise thin vertical blades each housed between adjacent rollers of the conveyor, the contact surfaces of such blades being situated in a plane lower than the upper plane of the rollers for the "down" position of the support, so that the conveyor need have no discontinuity. Still more advantageously the blade upper surface may be either serrated in order to obtain improved contact with hard and not very fragile loads, or covered with a smooth material when said loads are either fragile or have a surface which must not be deformed.

Travel end stops are suitably mounted to the support to limit the movement of the carriage in both directions.

Desirably an electric or pneumatic switch is associated with photo-electric cells so as to prevent possible collisions between the load to be transferred and any other loads circulating on the main conveyor.

In order that the present invention may more readily be understood the following description is given, merely by way of example, with reference to the accompanying drawings, in which:

FIGS. 1a to 1d show schematically a transfer device according to the present invention during the various phases of a transfer operation from one conveyor to another;

FIG. 2 is a top plan view of the device of FIGS. 1a to 1d;

FIG. 3 is a vertical sectional view of the device of FIGS. 1 and 2; and

FIG. 4 is a further sectional view of the device of FIGS. 1 to 3, but taken in a vertical plane perpendicular to the plane of section of FIG. 3.

Figure 1A:
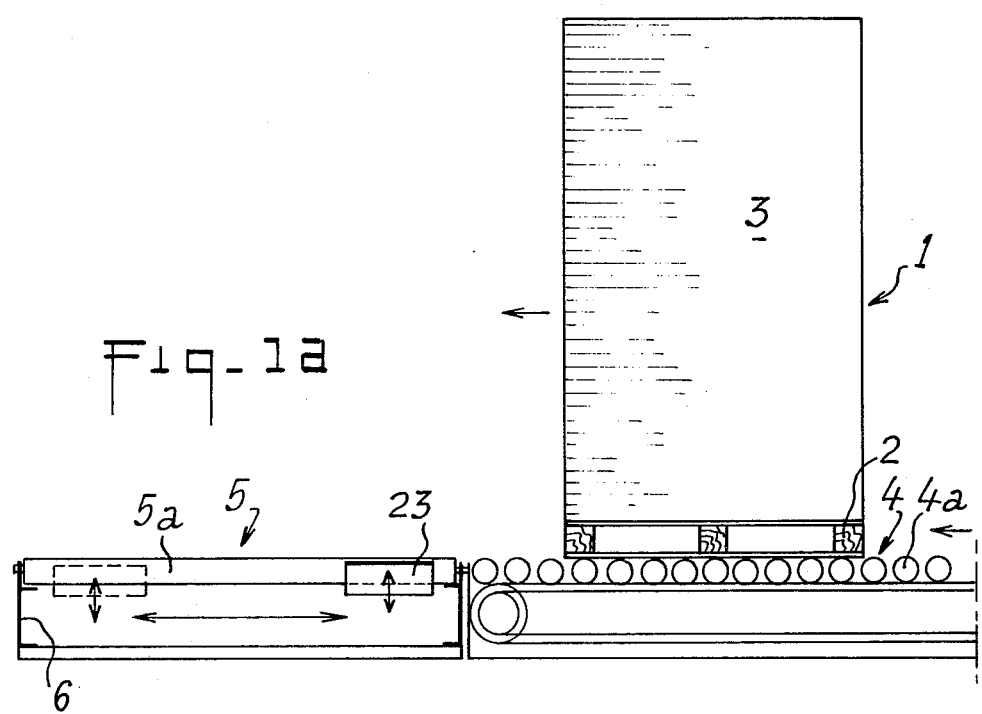

As shown in FIGS. 1a to 1d the load 1 to be handled by the conveyors comprises a handling pallet 2 supporting in this case a compressible or incompressible stack 3. This load 1 is to be transferred from a first roller conveyor 4 to a second roller conveyor 5 which is perpendicular to the first one, or to effect transfer in the reverse direction. The rollers of the two conveyors 4 and 5 may be either driven or freely idling.

The device shown in FIGS. 2 to 4 is positioned in the zone of transfer of the main conveyor, for example the conveyor 5 in which case the conveyor 4 is the transverse discharge conveyor. The vertically movable chassis 7 of the transfer device comprises two large transverse beams connected by narrower stringers 9 and is supported by the frame 6 of the conveyor 5.

A carriage 10 disposed transversely of the rollers 5a of the conveyor 5 is mounted above the chassis 7 of the transfer device and is equipped with running wheels 11 adapted to roll in running tracks formed by U section channels 12 which are integral with the independent chassis 7 and disposed parallel to the rollers 5a, that is in a vertical plane perpendicular to the transverse beams.

The carriage 10 is displaced by means of two chains 13 secured to the carriage by connecting means such as bolts 14 (FIG. 4). The chains are driven by means of sprockets 15 mounted on two shafts 16 and 17 disposed parallel to the stringers 9, the shaft 16 being idle while the driven one 17 is caused to rotate through the intermediary of a speed reducer 18 connected to a drive motor 19 by means of a chain 20 and pinions 21. Furthermore, chain tensioning pinions 22 are interposed between the sprockets 15 so as to regulate the tension of the chains 13. The motor 19 and its reducer 18 are also mounted on the independent chassis so that they move up and down with the chassis 7.

Lifting elements formed by blades 23 are secured to the carriage 10 via blade carriers 24 over the whole useful width of the transfer zone. Preferably each blade 23 is cantilevered to overhang the edge of the carriage 10 (FIG. 2) and secured between two adjacent rollers 5a of the main conveyor 5. The cantilevered fixing is due to the presence of drive means 25 for the rollers 5a, but it goes without saying that if the conveyors 4 and 5 are not equipped with drive means 25 in the position shown the travel of the carriage 19 will thereby be increased and the blades 23 may then be fixed to the carriage in a balanced configuration. The contact surface 26 of each blade 23 may have a roughened surface, for example by being notched so as to grip the load when the load carrying wooden pallet 2 is not fragile, or it may be covered with a smooth material so as to protect the fragile wrapping of said load when a delicate load is placed on the bare rollers 5a.

In order not to interrupt the continuity of the upper plane of the rollers 5a the "down" position of the chassis 7 is adjusted in such manner that the plane of the contact surfaces of the blades is just lower than the upper plane of the rollers 5a. The amplitude of vertical or transverse movement of the chassis 7 is then controlled by a stop 27 integral with the frame 6 of the conveyor 5 so that the elevated position of the independent chassis 7 is restricted. The raising movement of the chassis 7 is obtained by means of four pneumatic or hydraulic jacks 28 secured to the traverse beams with their piston rods 29 supported by the fixed frame 6 of the conveyor 5, see FIGS. 3 and 4. Consequently, it is the assembly of the independent chassis 7 and therefore of the carriage 10 and its integral blades 23 which is moved by the jacks 28, so that in the raised position the blades 23 are situated above the upper plane of the rollers 5a of the conveyor 5 while in the lowered position the independent chassis 7 rests on the frame 6 of conveyor 5 so the blades 23 are positioned below the upper plane of the rollers 5a (FIG. 3).

The travel of the carriage 10 along the U-shaped rails 12 is limited by cam follower rollers 30 mounted on the carriage 10 and co-operating with cam ramps or stops 31 secured to the stringers 9 (FIG. 2). The rollers 30 and stops or cams 31 are preferably distributed across the carriage.

As shown in FIG. 2, the rollers 30 and the cams or stops 31 permit maximum movement of the carriage 10 in both directions limited only by the positioning of the stringers 9. It is clear that this movement may be reduced when the loads to be transferred are small or do not consist of pallets but are placed on the rollers themselves.

It is also possible to provide for an alternative more rapid movement of the carriage in order to centre the load on the rollers 5a.

On the transverse discharge conveyor 4 there are further provided firstly means 32 (FIG. 4) for disengaging its rollers 4a in such manner that when the load 1 to be transferred has been taken up by the main conveyor 5 the said rollers 4a are no longer driven, and secondly an actuator 33 such as a solenoid or a pneumatic ram which, by causing at least one roller to rise, is capable of stopping the load 1 at the end of the transverse discharge conveyor 4 when another load is present in the transfer zone. A different possibility is to associate the said actuator with additional photo-electric cells, not shown. To this end the photo-electric cells may be disposed on both sides of the main conveyor 5 such that the light beam is directed diagonally of the zone of transfer defined on the main conveyor 5 by the theoretical prolongation of the transverse discharge conveyor 4. Thus, when a moving load on the main conveyor 5 cuts the light beam and another load disposed on the transverse discharge conveyor 4 should be transferred to the main conveyor 5 this transfer cannot take place until and unless the load on the main conveyor 5 has moved out of the transfer zone, that is to say when the light beam is no longer interrupted. In fact, the load or the transverse discharge conveyor 4 arriving at the actuator 33 causes the drive means of the rollers 4a of the transverse discharge conveyor 4 to stop as a result of energisation of the phot-electric cells upon beam cut-off. When the light beam to the cells is not cut, the passage of a load on the actuator 33 does not cause the rollers 4a of the transverse discharge conveyor 4 to be arrested.

Figure 1B:
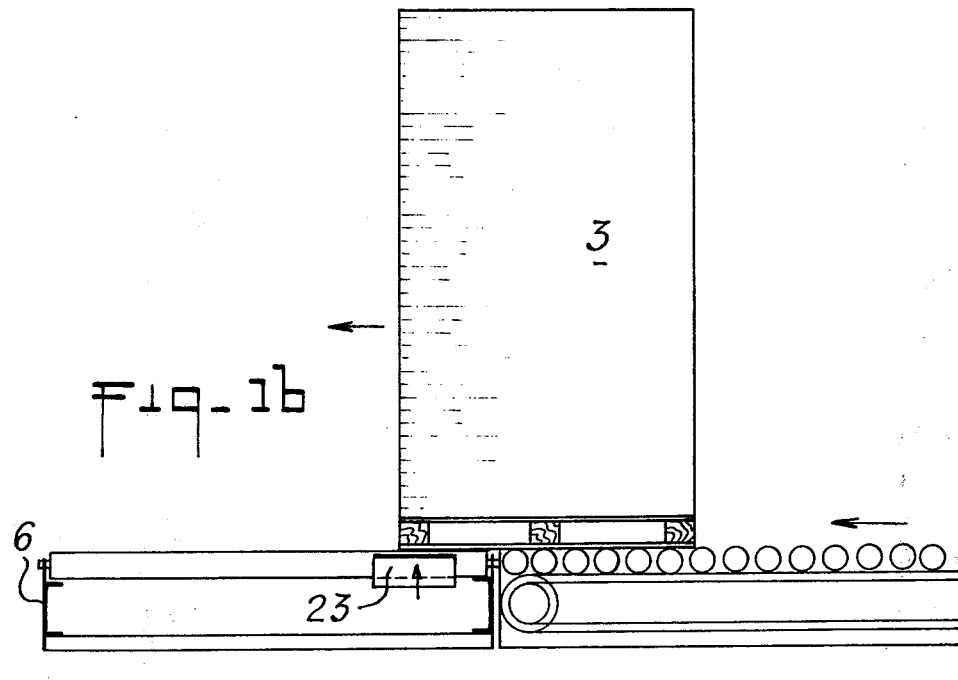

The operation of the device according to the invention is as follows, with reference to FIGS. 1a to 1d:

Upon a signal to transfer the load 1 from the transverse discharge conveyor 4 to the main conveyor 5, the carriage 10 moves so as to bring the lifting blades 23 close to the transverse discharge conveyor 4 (FIG. 1a). By virtue of an automatic control, the lifting blades 23 are raised as part of the load 1 arrives on the main conveyor 5, thereby causing partial lifting of the load 1 in such manner as to facilitate transfer of said load 1 from the rollers 4a to the rollers 5a which are perpendicular thereto (FIG. 1b).

At this instant the carriage 10 moves in the opposite direction to the previous one, so as to bring the load 1 entirely on the main conveyor, the independent chassis 7 and thus the carriage 10 and lifting blades 23 being in the raised position during this reversing movement (FIG. 1c).

When, at the end of its travel, the carriage 10 reaches a position which corresponds to the load 1 being positioned on the main conveyor 5, the independent chassis 7 is lowered to entrain withdrawl of the blades 23 below the upper plane of the rollers 5a (FIG. 1d).

Note that in all cases the loads 1 will be lifted by the blades 23. In fact, the distance between facing edges of two adjacent blades is less than the inter-axial spacing between two adjacent rollers, and less than the width of one of the elements forming the pallet 2.

The above described operation represents a transfer of a load from the transverse unloading conveyor 4 to the main conveyor 5 and has only been given in order to demonstrate that the device according to the invention permits this direction of transfer. It is clear that the transfer of a load from a main conveyor to a transverse discharge conveyor is the most usual operation and that it is possible to provide a further transverse discharge conveyor as a prolongation of the existing transverse discharge conveyor 4 at the other side of the area of conveyor 5 where the device of the invention is disposed.

It is thus possible to add to already existing main conveyors a number of transverse discharge conveyors without interfering with the existing installation, and as a function of contemporary requirements and of the layout of said main conveyor in the premises. One of the appreciable advantages of the transfer device according to the invention is that various main conveyors can be interconnected by transverse linking conveyors.

The chassis 7 of the mobile carriage may be varied from the precise embodiment illustrated while still being independent of the frame 6 of the conveyor 5. The support of the jacks 28 may be situated on any stationary part, for example, the ground, or on any suitable stationary portion of the frame of the device. This enables the device according to the invention to be used as a modification to any kind of already existing roller conveyor.

I claim:

1. A device for transferring a load between a first roller conveyor and a second roller conveyor perpendicularly-disposed thereto, said first and second roller conveyors including a plurality of rollers parallel to each other in said conveyor, said first roller conveyor comprising a frame supporting said plurality of rollers, said first roller conveyor having an end portion adjacent a side edge of said second roller conveyor, said device comprising:
  a chassis positioned below said rollers of said first roller conveyor;
  a carriage mounted in said chassis for movement along a path parallel to said rollers of said first conveyor;
  a plurality of supporting elements parallely disposed between rollers of said first roller conveyor, each of said supporting elements being mounted to said carriage;
  a drive means for reciprocally driving said carriage along said path between a first position wherein said supporting elements are spaced from said end portion of said second roller conveyor to a second position wherein said supporting elements are proximate to said end portion of said second roller conveyor; and
  means for vertically lifting said carriage relative to said frame of said first roller conveyor between a first position wherein said support elements lie below the upper horizontal plane of said rollers of said first roller conveyor to a second position wherein said support elements lie above said upper horizontal plane of said rollers of said first roller conveyor.

2. The device as claimed in claim 1 wherein each of said supporting elements is formed of a thin blade having an enlarged upper edge portion defining a contact surface for engagement with said load to be transferred.

3. The device as set forth in claim 2 wherein each of said blades overhang said carriage along a portion of their length.

4. The device as set forth in claim 2 wherein said chassis includes tracks for guiding said carriage during movement and wherein stop means are provided on said chassis and said carriage for limiting travel of said carriage.

5. The device as set forth in claim 2 wherein said drive means comprises a motor mounted on said chassis including drive chains by said motor, said drive chains being secured to said carriage and extending parallel to said first roller conveyor.

6. The device as set forth in claim 2 wherein said lifting means includes at least one fluid pressure operated jack for lifting said chassis relative to said frame of said first roller conveyor.

7. The device as set forth in claim 2 and further including an adjustable stop means for limiting the vertical movement of said carriage.

8. The device as set forth in claim 2 wherein said contact surface of the enlarged portions of said blades is serrated.

9. The device as set forth in claim 2 wherein said contact surface of the enlarged portions of said blades is smooth.

10. The device as defined in claim 2 wherein said contact surface of said supporting element is at all times disposed above the horizontal diametrical symmetrical plane of the rollers of said first roller conveyor.

* * * * *